United States Patent
Skull (10) Patent No.: US 8,542,499 B2
(45) Date of Patent: Sep. 24, 2013

(54) MULTI-POSITION MOUNT FOR ELECTRONIC DISPLAY

(75) Inventor: Joseph Skull, Fridley, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 404 days.

(21) Appl. No.: 12/811,680

(22) PCT Filed: Jan. 5, 2009

(86) PCT No.: PCT/US2009/030126
§ 371 (c)(1),
(2), (4) Date: Sep. 24, 2010

(87) PCT Pub. No.: WO2009/089164
PCT Pub. Date: Jul. 16, 2009

(65) Prior Publication Data
US 2011/0002110 A1    Jan. 6, 2011

Related U.S. Application Data

(60) Provisional application No. 61/019,096, filed on Jan. 4, 2008.

(51) Int. Cl.
*H02B 1/01* (2006.01)
(52) U.S. Cl.
USPC .............. 361/825; 361/679.01; 361/679.05; 361/679.07; 361/679.58

(58) Field of Classification Search
USPC ............... 361/825, 679.05, 679.07, 679.58; 248/299.1, 292.14, 284.1
See application file for complete search history.

(56) References Cited

U.S. PATENT DOCUMENTS

| | | | | |
|---|---|---|---|---|
| 5,582,376 A * | 12/1996 | Thompson | | 248/214 |
| 5,603,682 A * | 2/1997 | Grider | | 482/142 |
| 6,220,461 B1 * | 4/2001 | Dickinson | | 211/90.01 |
| 6,418,010 B1 * | 7/2002 | Sawyer | | 361/679.05 |
| D495,713 S * | 9/2004 | Pfister et al. | | D14/451 |
| 2005/0178941 A1 * | 8/2005 | Burns et al. | | 248/475.1 |

FOREIGN PATENT DOCUMENTS

| KR | 1997-0014535 | 4/1997 |
|---|---|---|
| KR | 1999-0012655 | 4/1999 |
| KR | 10-2007-0166466 | 12/2007 |

* cited by examiner

*Primary Examiner* — Tuan T Dinh
*Assistant Examiner* — Steven Sawyer
(74) *Attorney, Agent, or Firm* — Patterson Thuente Pedersen, P.A.

(57) ABSTRACT

A multi position mount for an electronic display providing an adjustable display interface including a mounting assembly providing adjustable movement in at least one direction as determined by a plurality of follower members disposed within slots for slideable movement, and includes a mounting bracket having flanges configured the receive the adjustable display interface in at least two distinct locations. A plurality of mounting positions are possible for quick and easy engagement and disengagement, where at least one position provides mounting of a flat panel device in very close proximity to a mounting surface, and at least one position provides for angled adjustment of a flat panel display.

12 Claims, 6 Drawing Sheets

MULTI-POSITION MOUNT FOR ELECTRONIC DISPLAY

RELATED APPLICATION

This application claims the benefit of U.S. Provisional Patent Application 61/019,096, filed on Jan. 4, 2008, hereby incorporated herein in its entirety by reference.

FIELD OF THE INVENTION

The present invention relates generally to mounts for video display devices, and more particularly to mounts for flat panel displays.

BACKGROUND OF THE INVENTION

Flat panel monitors and televisions have become highly popular and widely used throughout commercial, business, and residential environments around the globe. These flat panel displays allow an enhanced viewing experience with layout versatility, space savings, and the ability to replace bulky computer monitors and television sets with displays that are merely a fraction of the depth and weight of similar prior displays of identical screen size.

The dimensional characteristics of the displays allow them to be conveniently hung on a wall or connected to a mounting surface such as a column, post, or flat surface of a piece of furniture. The ability to mount these devices near a wall provides an attractive display arrangement. When such mounting is utilized, it is highly desirable to be capable of readily adjusting the position or orientation of a flat panel display. Versatility of movement of the mount is often important to achieving a device that is positioned exactly in the most functional or aesthetically pleasing location desired by the user. Such versatility is particularly desirable as the unique characteristics of a wall or mounting surface may dictate the location where the mount may be attached.

Many past mounts have provided designs that, while adjustable, do not provide the option of a mounting arrangement that places the flat panel display in extremely close relation with a wall. This is often the case when clearance space is needed for tilting movement of adjustable mounting structures and for accommodating the adjustment mechanisms necessary for such movement. The ability to have a flat panel arrangement mounted very closely to a wall is desirable for aesthetic reasons in addition to space savings provided. It is also desirable, however, to have a mount equipped with adjustability features that can be easily implemented. Moreover, a simple design which can be easily manufactured is also sought.

Therefore, there is a need for a display mount providing close wall-mounting, enhanced versatility of positioning and adjustment, and which can be manufactured at a relatively low cost.

SUMMARY OF THE INVENTION

The present invention addresses the need of the industry for a flat panel display mount that provides enhanced positioning ability, versatility of movement, and ease of installation, maintenance, and manipulation.

Embodiments of the display mount generally include an adjustable display interface that includes a mounting structure for attachment to a flat panel display providing adjustable movement in at least one direction as determined by a plurality of follower members disposed within slots for slideable movement, and a mounting bracket having flanges adapted for receiving the adjustable display interface so that it may reside in one of a plurality of potential locations.

The invention provides advantages of multiple possible mounting locations which may be quickly engaged and disengaged, where at least one location allows for mounting a flat panel device in very close proximity to a mounting surface, and at least one location allows for angled adjustment of a flat panel display. Further, the mount is arranged such that it is largely self-balanced when the display is adjusted.

BRIEF DESCRIPTION OF THE DRAWINGS

The invention may be more completely understood in consideration of the following detailed description of various embodiments of the invention in connection with the following drawings, in which.

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE PREFERRED EMBODIMENTS

The present invention relates to an adjustable display mount for attaching a flat panel electronic display to a fixed structure. Such flat panel displays include plasma displays, liquid crystal displays (LCDs), or any other kind of electronic display that is of similar dimensions or characteristics. Fixed structures generally refer to walls, but also may include ceilings, beams, columns, pieces of furniture, booths, or any other fixed or permanent structure to which a display mount might be attached.

Figure 1A:
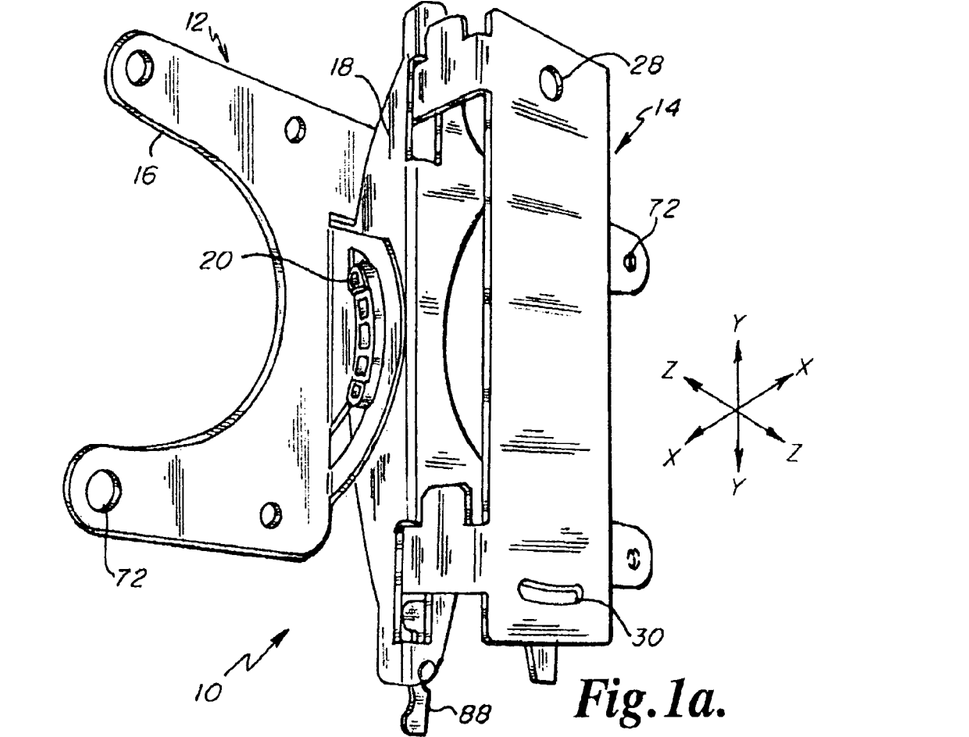
FIG. 1 is a perspective view of a flat panel display mount according to an embodiment of the invention.
Figure 1B:
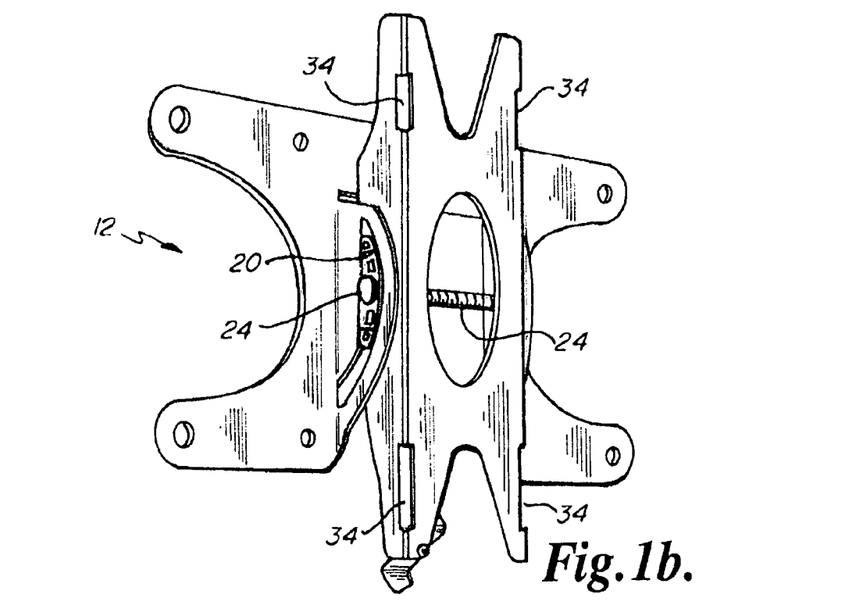

An embodiment of a flat panel display wall mount is depicted in FIGS. 1 through 9. Such a mount embodiment may be particularly well-suited for mounting relatively small or midsize flat panel electronic devices. FIG. 1 depicts an embodiment of the present invention in which an adjustable display mount 10 generally includes an adjustable display interface 12 and a mounting bracket 14. The adjustable display interface 12 generally includes a mounting assembly 16, connecting assembly 18, two arcuate follower members 20 and 22, a bolt 24 and a fastener 26. Mounting bracket 14 is a single piece mounting structure that is generally attachable to a fixed structure with any suitable fastener or attachment means that utilizes upper mounting aperture 28 and lower mounting aperture 30.

FIG. 1 also designates, for reference purposes, the relative directions of x-y-z coordinates as applied to the mounting system. Any reference herein to movement in an x-axis direction, a y-axis direction, or a z-axis direction relates to these coordinate axes. The y-axis is oriented up and down, the z-axis is fore-and-aft, and the x-axis is perpendicular to the z-axis and the y-axis, and is oriented laterally from side-to-side of the mounting system.

The device seen in FIG. 1 is a display mount which provides dual position mounting as well as tilt adjustability. When mounting bracket 14 is fixed to a wall or similar surface, mounting assembly 16 of adjustable display interface 12 would typically be mounted to the back of a flat panel display, although no such display is shown here for clarity and better viewing of the mount. Receiving slots 34 in the back of the adjustable display interface 12 are coupled to four corresponding flange members 40 located on mounting bracket 14. These slots may be a set of interior slots 36 or outer slots 38 located on mounting bracket 14. (See FIGS. 2 and 3) Engagement with the interior slots 36 provides an extremely close mounting configuration with respect to the a wall or other surface where the mounting bracket 14 may be attached. Alternatively, engagement with the outer slots 38 provides clearance space such that the mounting assembly 16 and an attached flat panel display can be adjusted by tilting to achieve a desired viewing angle.

Figure 2:
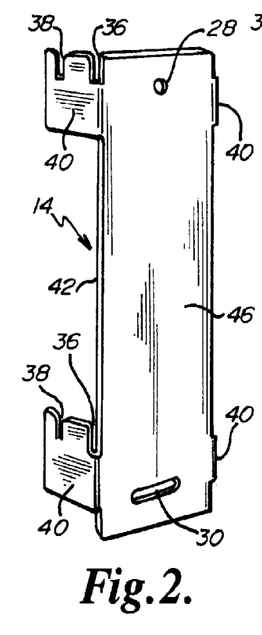
FIG. 2 is a perspective view of the parts of the display mount of FIG. 1 where the adjustable display interface is separated from the mounting bracket.

The individual parts of the adjustable mount 10 can be better understood from FIG. 2 where the adjustable display interface 12 and adjustable mounting bracket 14 are shown separated from one another. Mounting bracket 14 is a single piece rigid member with two slots 36 and 38 on each of its four flange members 40. The adjustable display interface 12 is, however, a multi-piece assembly of parts that may be moved and adjusted.

Figure 3:
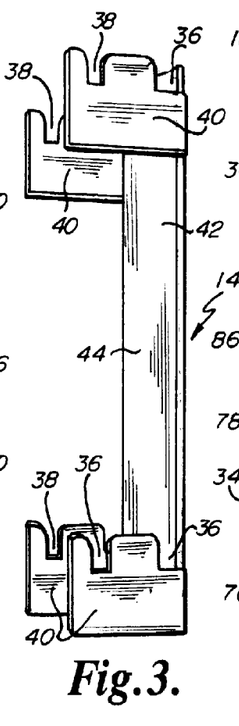
FIG. 3 is a perspective view of the mounting bracket for the display mount of FIG. 1.

FIG. 3 discloses the mounting bracket 14 in greater detail. Mounting bracket 14 generally has a flat rectangular base plate 42 with a front face 44 and a rear face 46. The back face 46 is abutted into engagement with a wall or other fixed mounting structure. The front face 44 is exposed to an attached adjustable display interface 12. The mounting bracket 14 is secured to a wall with fasteners through the upper mounting aperture 28 and lower mounting aperture 30. The mounting bracket 14 also has four flanges 40 disposed in perpendicular relation to the base 42. Each flange 40 shown has a corresponding interior slot 36 and an exterior slot 38 that are formed within the upper edge of the flange. Flanges with additional slots providing further adjustment locations and capabilities are contemplated by this invention as well. Taken as a group, interior slots 36 or exterior slots 38 form sets of engagement structure with four corresponding coupling locations.

Figure 4:
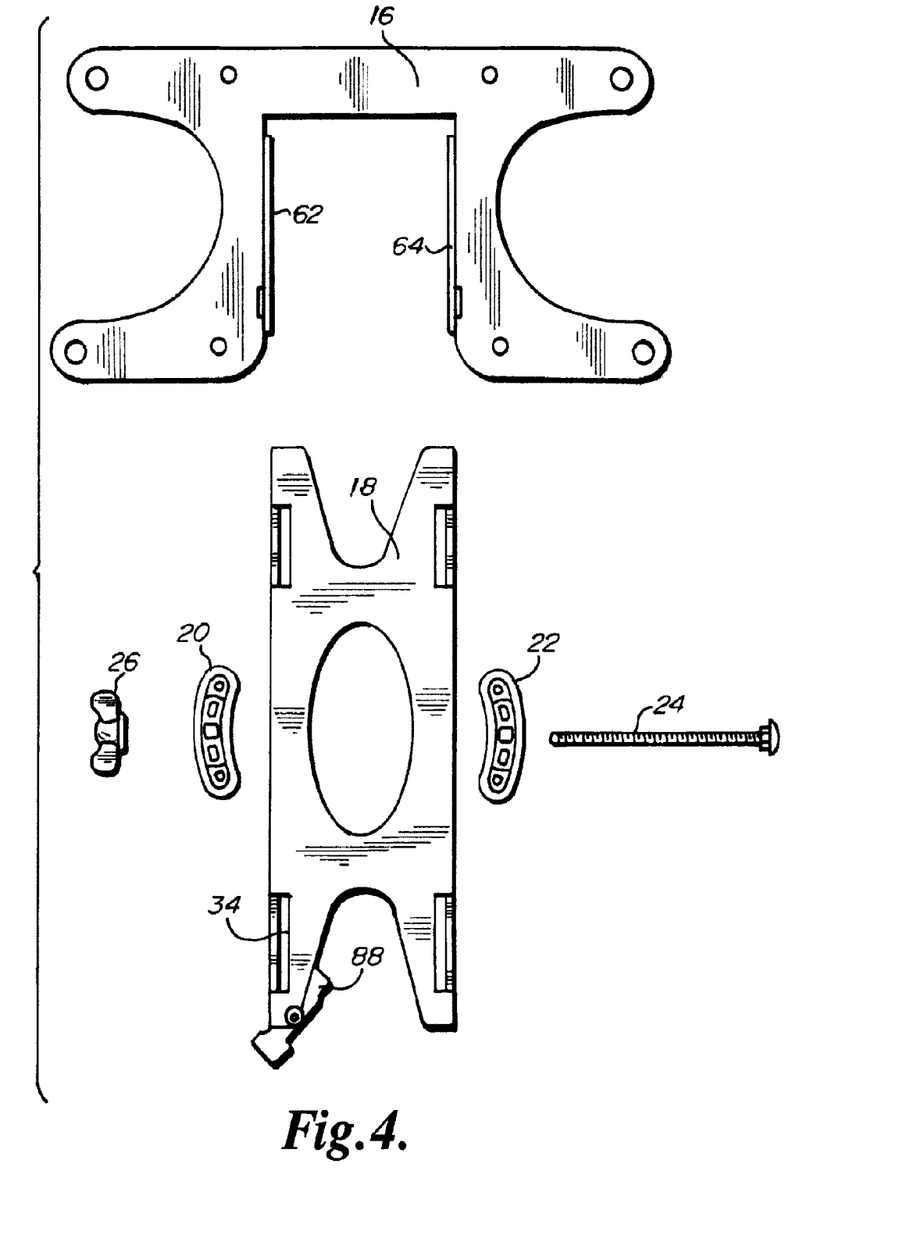
FIG. 4 is a rear view of the parts of an adjustable display interface of a display mount of FIG. 1.

In FIG. 4, the parts of the adjustable display interface can be seen in a disassembled form for purposes of explanation. Generally, the adjustable display interface 12 includes a mounting assembly 16, connecting assembly 18, two arcuate follower members 20 and 22, a bolt 24, and a fastener 26. The example of a bolt 24 and fastener 26 might be used to hold the adjustable display interface 12 together in adjustable, slideable relation. This fastener and bolt arrangement may be placed in the assembly for tightening through either side of the mount assembly, as desired. The individual parts of the adjustable display interface 12 can be seen individually in greater detail in FIGS. 4a-4c.

Figure 4A:
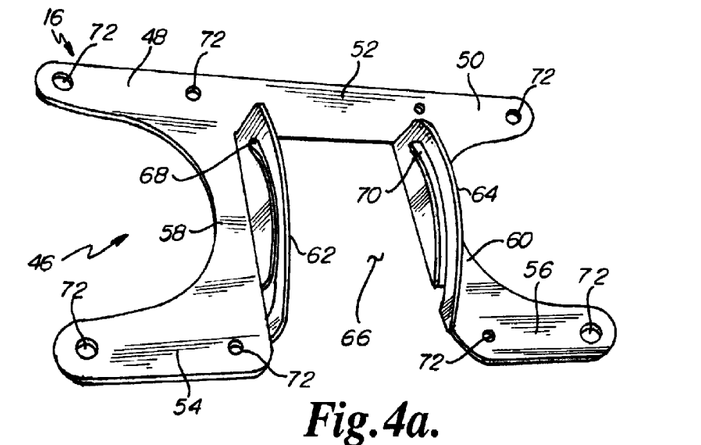
FIGS. 4a-c are perspective views of parts of an adjustable display interface of a display mount of FIG. 1.

The mounting assembly 16 is shown in FIG. 4a. Mounting assembly 16 is generally a continuous flat plate of sheet metal formed to contain two outwardly projecting sections 48 and 50 from either side of a top bar 52, two lower portions 54 and 56 extending from mid sections 58 and 60. The mounting assembly 16 additionally contains two perpendicular metal flanges 62 and 64 surrounding the open central portion 66. The perpendicular flanges have a curved periphery and interior arcuate slots 68 and 70 formed in each flange, such that the slots 68 and 70 are in spaced-apart parallel relation to one another. Apertures 72 are found in various locations on the mounting assembly 16 for attachment by fasteners to the back of a flat panel display. The back face 46 of the mounting assembly 16 is shown in FIG. 4a. This back face 46 faces away from a mounted flat panel display. The generally flat front-face of the mounting assembly 16 (not shown), is mounted in abutting relationship to the back surface of a mounted flat panel display.

Figure 4B:
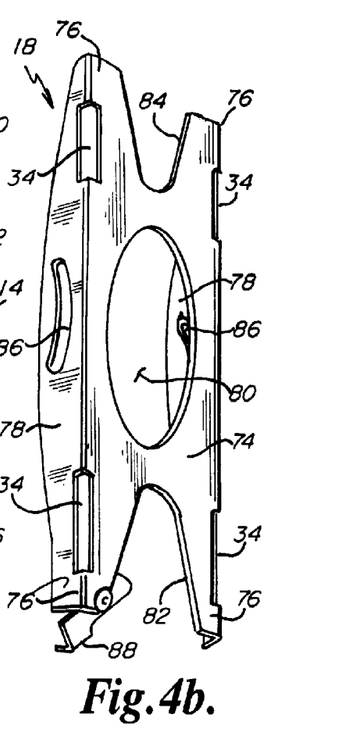

FIG. 4b sets forth a connecting assembly 18 of the adjustable display interface 12. The connecting assembly 18 generally has a primarily flat surface 74 with four outwardly projecting corners 76 which form a somewhat rectangular shape. The width of the connecting assembly 18 is narrower than the span between the flanges 62 and 64 of the mounting assembly 16. Along each of the longer edges of the connecting assembly 18 are perpendicularly disposed flanges 78. The flat surface 74 of the connecting assembly 18 has four receiving slots 34 spaced around its edges. These slots 34 are used for connection with the slots located on the flanges 40 of the mounting bracket 16 during operation. The flat surface 74 also contains a large central aperture 80 and two curved perimeter surfaces 82 and 84.

Centrally located in the flanges 78 are arcuate slots 86. The angle of curvature of the arcuate slots 86 being approximately the same as the arcuate slots 68 and 70 in the flanges 62 and 64 of the mounting assembly 16. When assembled these arcuate slots help to provide an tiltable adjustment relationship between the connecting assembly 18 and the mounting bracket 16.

At one corner of the connecting assembly 18 is a locking mechanism 88. Locking mechanism 88 is generally a pivotally mounted metal latch that may partially cause interference with one of flanges 40 when disposed in one of the receiving slots 34 when the locking mechanism 88 is pivoted into position.

Figure 4C:
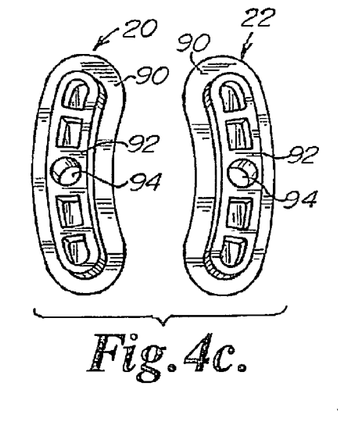
Figure 4D:
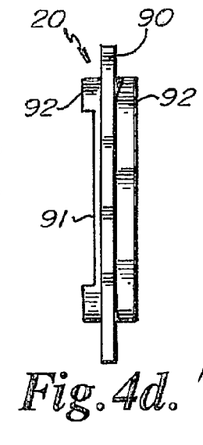
FIG. 4d is a front view of a follower member of a display mount of FIG. 1.

FIGS. 4c and 4d set forth the follower members 20 and 22 of the adjustable display interface 12. Each member has a flat arcuate shaped outer portion 90 from which smaller inner arcuate shaped protrusions 92 extend on both sides. The inner protrusions 92 are shaped to mate with the slots 86 in the connecting assembly 18 on one side and the second inner protrusion 92 is shaped to slide within the arc shaped slot 68 or 70 of the mounting assembly 16. There is a central aperture 94 in the follower members 20 and 22 through which a bolt 24 may extend. As depicted in FIG. 4d one side of follower members 20 and 22 may have a recessed surface 91 sized to accommodate fastener 26 in order to achieve a tighter frictional interference with the outer side of flange 62 or 64 of the mounting assembly 16 when the adjustable display mount 10 is assembled.

Figure 5:
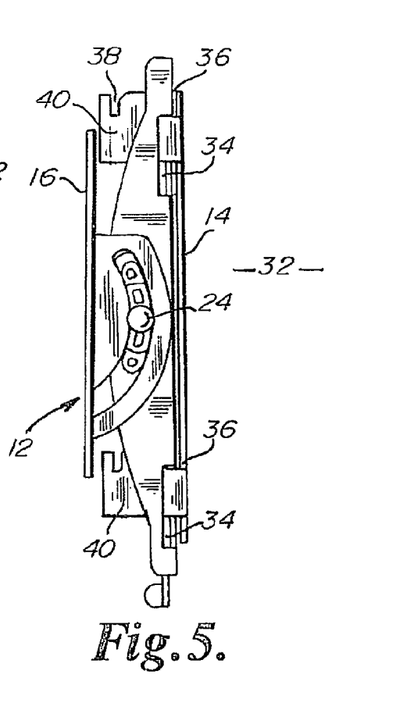
FIG. 5 is perspective view of a display mount of FIG. 1 in a first position utilizing a first bracket slot.
Figure 6:
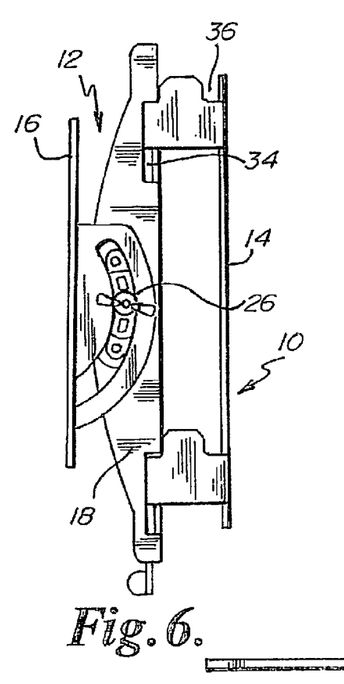
FIG. 6 is side view of a display mount of FIG. 1 in a second position utilizing a second bracket slot.
Figure 6A:
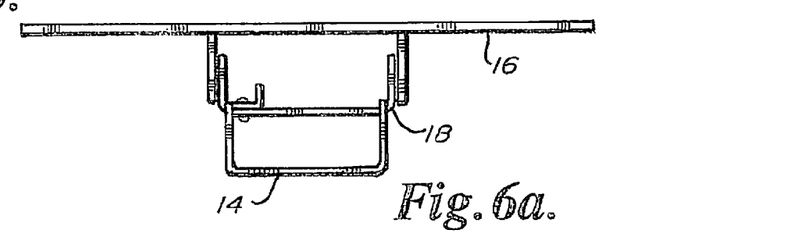
FIG. 6a is top view of a display mount of FIG. 1 in a second position utilizing a second bracket slot.
Figure 7:
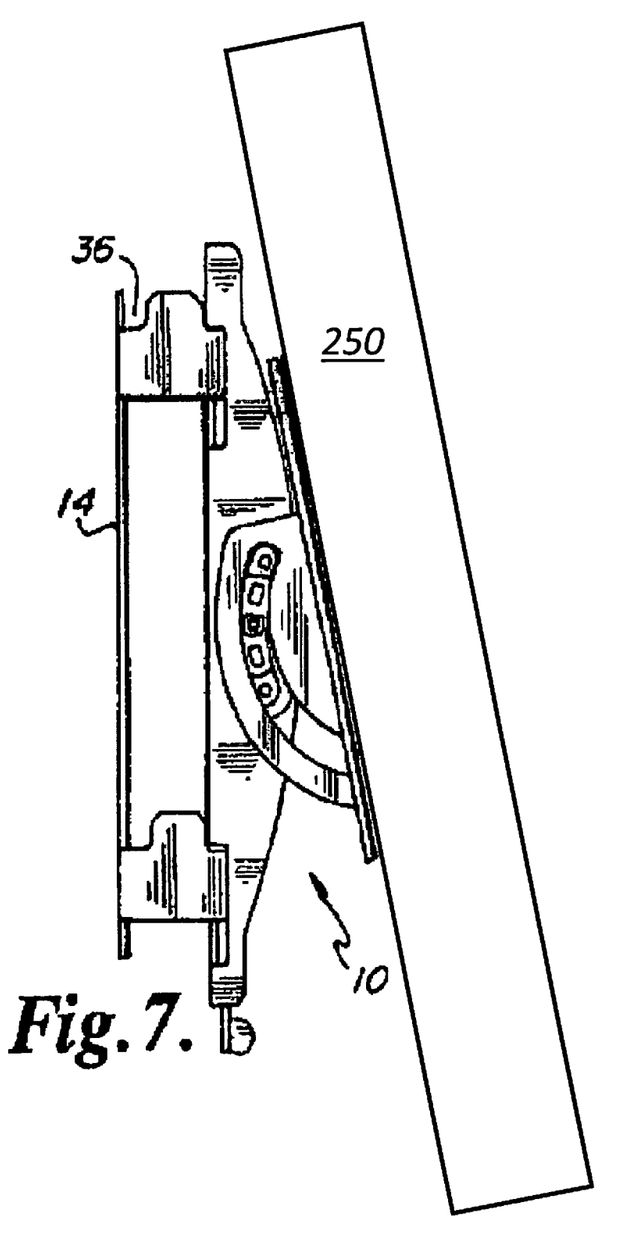
FIG. 7 is side view of a display mount of FIG. 1 in a second position utilizing a second bracket slot and in a pivoted alignment.

The configuration and adjustability of the assembled adjustable wall mount 10 can be seen in FIGS. 5-7. FIG. 5 shows the mount assembled in a first configuration where the mount enables a flat panel display to be mounted on mounting assembly 16 in very close relation to the wall 32. Here, the receiving slots 34 of the adjustable display interface 12 are engaged over flanges 40 and into the four corresponding interior slots 36 of the mounting bracket 14. This position generally requires the mounting assembly 16 to be in a generally upright position parallel to the wall 32 as the bracket 14 and assembly would cause interference with the mounting assembly 16 if rotated. Maximum space is saved by mounting a flat panel display in this way and an appealing wall-mounted arrangement is achieved.

FIG. 6 shows the mount assembled in a second configuration where the mount enables adjustment of the flat panel display. In this arrangement, the receiving slots 34 of the adjustable display interface 12 are engaged over flanges 40 and into the four corresponding outer slots 38 of the mounting bracket 14. Utilizing this configuration provides clearance for rotation of the mounting assembly 16 and an attached flat panel display (not shown). The rotation of mounting assembly 16 is governed by tightening and loosening the fastener 26 and allowing the slots 68 and 70 of the mounting assembly 16 to slide along the protrusions 92 of follower members 20 and 22 located in slots 86 of the connecting assembly 18.

For example, FIG. 7 discloses an example of a mount in the configuration of FIG. 6 where the mounting assembly 16 is being tilted in an angled manner. To achieve this configuration a user must loosen the fastener 26 from the bolt 24 (not shown here for clarity) such that the arcuate slots 70 of the mounting assembly 16 may slide freely along the outer protrusion 92 of the follower members 20 and 22. This movement provides tilting that enables a user to position a flat panel display 250 in an angled manner while still positioning the flat panel display 250 in relatively close relation to the wall or mounting surface.

Another feature of this design is that the arrangement provided may be a self-balanced adjustable system for flat panel mounting. When the adjustable display interface 12 is attached to a flat panel display a curved guide structure may provide a systantially constant radius of curvature with a center disposed proximate the center of gravity of the flat panel display. This configuration enables the positioning of the display with virtually equal effort to the display in any desired orientation. Therefore, in one embodiment, when a flat panel display is attached to a fixed surface with the adjustable display mount, the display is adapted to revolve about a substantially horizontal axis extending proximate a center of gravity of the display such that the display and display interface allow for self-balancing. Further, details of how such self-balancing is accomplished may be understood from U.S. Pat. No. 6,905,101, hereby fully incorporated herein by reference.

Figure 8:
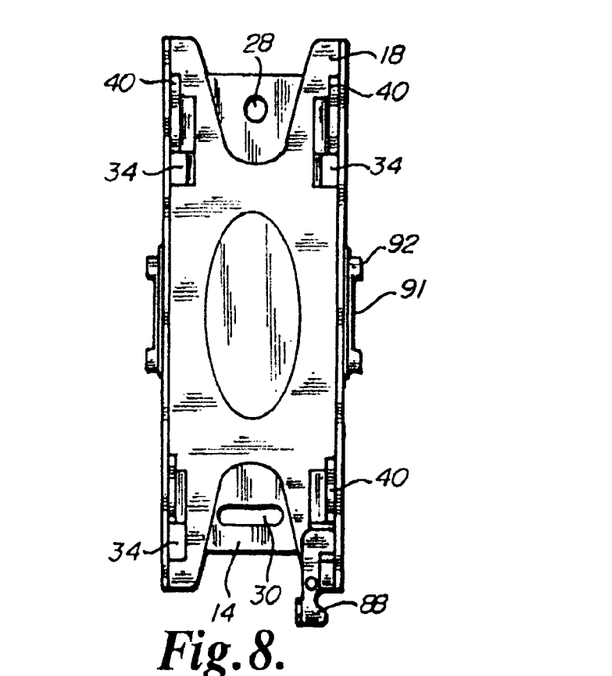
FIG. 8 is a front view of the flat panel display mount of FIG. 1 where the display interface is removed from the mounting bracket and connecting assembly.
Figure 9:
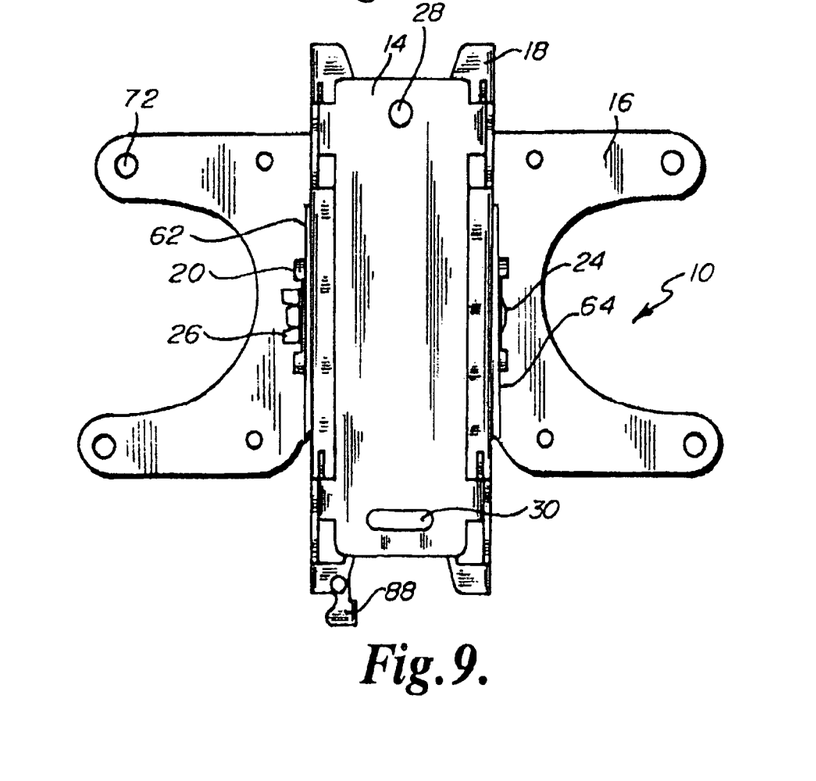
FIG. 9 is a rear view of the flat panel display mount of FIG. 1.

FIGS. 8 and 9 reveal front and rear views, respectively, of the display mount 10 for greater structural clarity. In FIG. 8 the mounting assembly 16 is removed for clarity. The relative spacing of the connecting assembly 18 and mounting assembly 16 can be seen as well as the centrally disposed bolt 24 and general configuration of the locking mechanism 88 in the locked position.

Therefore, installation and use of the display device may be performed by carrying out a series of steps. In general, the user must first mount the bracket 14 to a fixed structure using any suitable fastening means in connection with apertures 28 and 30. The user must also attach the adjustable display interface 12 to the desired flat panel display by using any suitable fastening means in connection with apertures 72 on the mounting assembly 16. Next, the user must select the desired slot in the mounting bracket 14 for engagement and then place the receiving slots 34 of the adjustable display interface 12 in engaged relation to the slots 36 or 38 of the mounting bracket 14. If the user selected the outer slots 38 for engagement, the user may then loosen fastener 26 such that mounting bracket 14 may glide around the followers 20 and 22 according to the movement allowed by slots 68 and 70. The fastener 26 may then be tightened into position at the desired configuration.

Embodiments other than those explicitly set forth in the figures are contemplated by this invention as well. For example, while only a single slot 68 and 70 are used on each side of the mounting assembly 16, using a plurality of slots is likewise contemplated. Similarly, while the slots disclosed in the figures are arcuate and curved, utilizing straight guide slots is likewise contemplated. An arrangement having an adjustable display interface allowing motion in more than one direction is also possible through use of readily known mounting devices with multidirectional mounting features.

In another embodiment a mounting bracket is configured to provide more than two locations where the display interface 12 is attached to the mounting bracket. For example, the mounting bracket having a variety of flange structures is contemplated where the display interface 12 is mounted at different heights and distances from the fixed structure along the mounting bracket. An arrangement reversing the location of the engagement slots and the flanges between the display interface and the mounting bracket is also contemplated.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A mounting system for mounting a flat panel display device to a fixed structure, the system comprising:
   a mounting bracket configured to attach to the fixed structure and defining at least a pair of coupling locations, the coupling locations being substantially parallel with each other;
   a connecting assembly receivable on the mounting bracket at each of the pair of coupling locations; and a display interface adapted to receive the flat panel display, the display interface operably coupled to the connecting assembly;
   wherein the first coupling location defined on the mounting bracket defines a first distance between the flat panel display and the fixed structure, and wherein the second coupling location defined on the mounting bracket defines a second distance between the flat panel display and the fixed structure, the second distance being greater than the first distance; wherein the display interface is operably coupled to the connecting assembly such that the display interface is selectively rotatable about a horizontal tilt axis to enable tilting position adjustment of the flat panel display; wherein a portion of the display interface defines a pair of arcuate slots, each positioned along an arc of a circle, the connecting assembly carrying a pair of follower members, each of the follower members slidably engaged in a separate one of the arcuate slots to operably couple the display interface to the connecting assembly.

2. The mounting system of claim 1, wherein the second distance is such that the display interface is rotatably positionable about at least one horizontal axis extending through the flat panel display.

3. The mounting system of claim 1, wherein the coupling location at the first distance comprises a plurality of slots.

4. The mounting system of claim 1, wherein the coupling location at the second distance comprises a plurality of slots.

5. The mounting system of claim 1, wherein the coupling locations at the first distance and the second distance comprise a plurality of slots.

6. The mounting system of claim 1, wherein the connecting assembly further comprises a locking mechanism configured to secure the connecting assembly to the mounting bracket.

7. The mounting system of claim 1, wherein the display interface is configured to self-balance at a plurality of locations about the horizontal tilt axis.

8. An adjustable flat panel display device and mounting system adapted for attachment to a fixed structure, the system comprising: a flat panel display device; and a mount comprising:
    a mounting bracket configured to attach to the fixed structure and defining at least a pair of coupling locations, the coupling locations being substantially parallel with each other;
    a connecting assembly receivable on the mounting bracket at each of the pair of coupling locations; and a display interface adapted to receive the flat panel display, the display interface operably coupled to the connecting assembly, wherein the first coupling location defined on the mounting bracket defines a first distance between the flat panel display and the fixed structure, and wherein the second coupling location defined on the mounting bracket defines a second; wherein the display interface is operably coupled to the connecting assembly such that the display interface is selectively rotatable about a horizontal tilt axis to enable tilting position adjustment of the flat panel display; and a portion of the display interface defines a pair of arcuate slots, each positioned along an arc of a circle, the connecting assembly carrying a pair of follower members, each of the follower members slidably engaged in a separate one of the arcuate slots to operably couple the display interface to the connecting assembly.

9. The adjustable flat panel display device and mounting system of claim 8, wherein the mounting bracket defines a plurality of connecting slot pairs disposed on flanges oriented perpendicularly to the fixed structure, each connecting slot pair defining one of the coupling locations; wherein the connecting assembly configured to connect to coupled to the connecting slots of the mounting bracket.

10. The adjustable flat panel display device and mounting system of claim 9, wherein the connecting assembly further comprises a locking mechanism configured to secure the connecting assembly to the mounting bracket.

11. A mounting system for mounting a flat panel display device to a fixed structure, the system comprising:
    a mounting bracket configured to attach to the fixed structure, the mounting bracket defining at least a pair of coupling locations, the coupling locations being substantially parallel with each other; a display interface receivable on the mounting bracket at each of the pair of coupling locations; wherein when the display interface is received on the mounting bracket at a first one of the pair of coupling locations the flat panel display is disposed a first distance from the fixed structure,
    wherein when the display interface is received on the mounting bracket at a second one of the pair of coupling locations, the flat panel display is disposed a second distance from the fixed structure, the second distance being greater than the first distance; and
    wherein the flat panel display is selectively rotatable about at least one axis of rotation extending through the flat panel display; wherein a portion of the display interface defines a pair of arcuate slots, each positioned along an arc of a circle, the connecting assembly carrying a pair of follower members, each of the follower members slidably engaged in a separate one of the arcuate slots to operably couple the display interface to the connecting assembly.

12. The mounting system of claim 11, wherein the display interface further comprises a connecting assembly operably coupled to the mounting bracket.

\* \* \* \* \*